(12) United States Patent
Wu et al.

(10) Patent No.: US 8,194,051 B2
(45) Date of Patent: Jun. 5, 2012

(54) MULTIPLE FINGERS TOUCH SENSING METHOD USING MATCHING ALGORITHM

(75) Inventors: Hung Wei Wu, Zhonghe (TW);
Chiung-Fu Chen, Magong (TW);
Shao-Sheng Yang, Kaohsiung (TW)

(73) Assignee: Silicon Integrated Systems Corp., Hsinchu (TW)

( * ) Notice: Subject to any disclaimer, the term of this patent is extended or adjusted under 35 U.S.C. 154(b) by 329 days.

(21) Appl. No.: 12/638,966

(22) Filed: Dec. 15, 2009

(65) Prior Publication Data

US 2011/0141054 A1 Jun. 16, 2011

(51) Int. Cl.
*G06F 3/045* (2006.01)
(52) U.S. Cl. .................................................... 345/174
(58) Field of Classification Search .................. 345/174, 345/178
See application file for complete search history.

(56) References Cited

U.S. PATENT DOCUMENTS

2010/0102816 A1* 4/2010 Nielsen et al. ................ 324/309
2010/0302212 A1* 12/2010 Weber et al. .................. 345/178

* cited by examiner

*Primary Examiner* — Fred Tzeng

(57) ABSTRACT

A touch sensing method for detecting positions of touching is disclosed. In the present invention, a reference touch profile is provided. A variable ideal combination profile indicating multiple touches is obtained by synthesizing a plurality of reference touch profiles at different positions. The variable ideal combination profile is matched with a sensing signal. Actual touch positions can be identified from the sensing signal when the matching of the variable ideal combination profile with the sensing signal is optimal.

22 Claims, 15 Drawing Sheets

MULTIPLE FINGERS TOUCH SENSING METHOD USING MATCHING ALGORITHM

TECHNICAL FIELD OF THE INVENTION

The present invention relates to touch sensing, more particularly, to a touch sensing method using a matching algorithm, the method is especially adaptable for sensing multiple touches occurring at the same time.

BACKGROUND OF THE INVENTION

FIG. 1 is a schematic diagram showing a general touch sensing device 1. The touch sensing device 1 has a touch panel 10, which comprises a sensing array having traces interlacing as rows and columns (e.g. 12 and 14). The columns of traces 14 are detected through a touch sensor 14, and the rows of traces 12 are detected through a touch sensor 16. The touch sensors 14 and 16 pass sensing signals indicating the detected results to a touch controller 18 to determine the position and strength of one or more touches occurring to the touch panel 10. Such a touch sensing device 1 and operations thereof are widely known in this field.

When two fingers touch the touch panel 10 at the same time at positions 15 and 17, for example, the waveform profiles of the sensing signal in X-axis and in Y-axis are shown at the bottom side and the left side of FIG. 1, respectively. As shown, in Y-axis dimension, the waveform has only one peak since the two positions 15 and 17 are substantially on the same row. In X-axis dimension, the waveform has two peaks since the two touch positions 15 and 17 are on different columns.

By observing the waveform of the sensing signal, the touch positions can be known. Ideally, when there are two touches occurring on two different columns or rows, the waveform will appear a profile as "peak-valley-peak". That is, there are two maxima and a minimum appearing therebetween in the waveform profile. FIG. 2 shows various waveform profiles for a sensing signal when there are two touches occurring. The chart (a) shows an ideal situation. As shown, the waveform has a profile appearing "peak-valley-peak". The two peaks respectively indicate the coordinates of the two touch positions at this dimension, and the valley indicates a space between the two touches. However, in practice, it is possible that the waveform is not so prefect. The chart (b) shows a situation in which the sensing signal is interfered by noises. As can be seen, the valley disappears due to the noises. Under such a circumstance, it is difficult to distinguish the two touch positions. The chart (c) shows a situation in which the two touch positions are too close so that the two peaks overlap with each other. In this case, it is also very difficult to distinguish the two touch positions.

Conventionally, a position is calculated by a centroid formula given below, which is used to find the touch position:

$$X_{touch} = \frac{\sum_i X[i] * W[i]}{\sum_i W[i]}, \quad (1)$$

where $X_{touch}$ is a coordinate of the touch position, $X[i]$ is a coordinate of the $i^{th}$ line (e.g. column), $W[i]$ is a signal magnitude at the $i^{th}$ line, i starts at a start point of a touch region and ends at an end point of the touch region. Such a scheme is easily influenced by noises, that is, the calculated potion may drift due to the noises.

Therefore, there is a need for a method to more effectively and accurately judge positions of touches occurring on a touch panel or the like without being influenced by noises even when the touch positions are close to each other.

SUMMARY OF THE INVENTION

An objective of the present invention is to provide a touch sensing method which is capable of effectively and accurately detecting touch position(s) for a touch sensor in a touch panel of the like.

In accordance with an aspect of the present invention, a touch sensing method for detecting touching to a touch sensor, the method comprises providing a reference touch profile indicating an ideal touch; extracting a sensing signal from the touch sensor; matching the reference touch profile with the sensing signal to find an optimal result by moving the reference touch profile; and identifying a position of touching from the reference touch profile in correspondence to the optimal result.

In accordance with another aspect of the present invention, a touch sensing method for detecting touching to a touch sensor, the method comprises providing a reference touch profile indicating an ideal touch; extracting a sensing signal from the touch sensor; synthesizing a plurality of the reference touch profiles to compose an ideal combination profile; matching the ideal combination profile with the sensing signal by changing positions of centroids of the reference touch profiles composing the ideal combination profile so as to find an optimal result; and identifying positions of touching from the ideal combination profile in correspondence to the optimal result.

The matching can be implemented by correlating the reference touch profile or the ideal combination profile composed of plural reference touch profiles with the sensing signal. Alternatively, the matching can be implemented by calculating a difference between the reference touch profile (or the ideal combination profile composed of plural reference touch profiles) and the sensing signal.

BRIEF DESCRIPTION OF THE DRAWINGS

The present invention will be described in detail in conjunction with the appending drawings, in which.

DETAILED DESCRIPTION OF THE INVENTION

Figure 1:
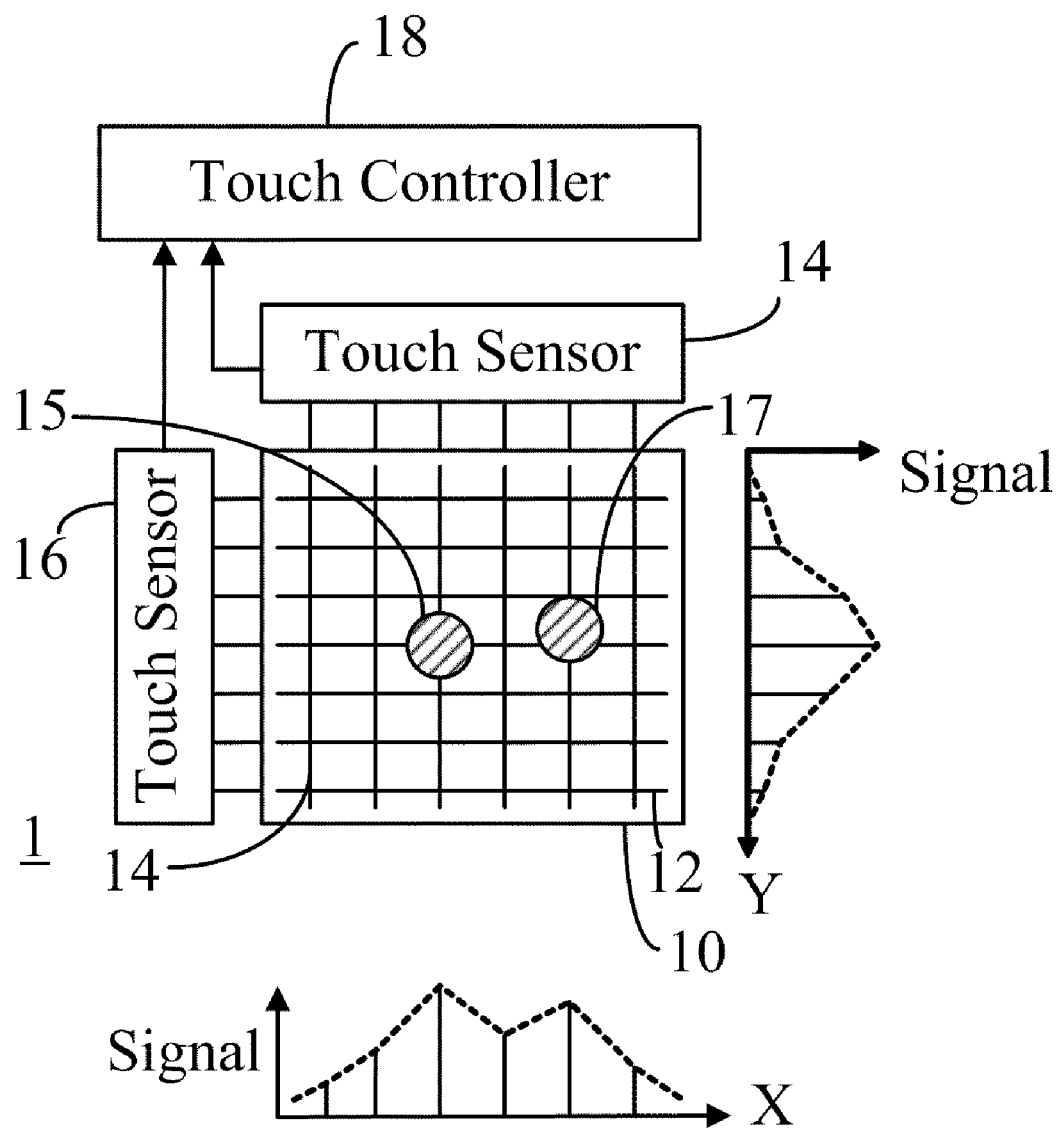
FIG. 1 is a schematic diagram showing a general touch sensing device.
Figure 2:
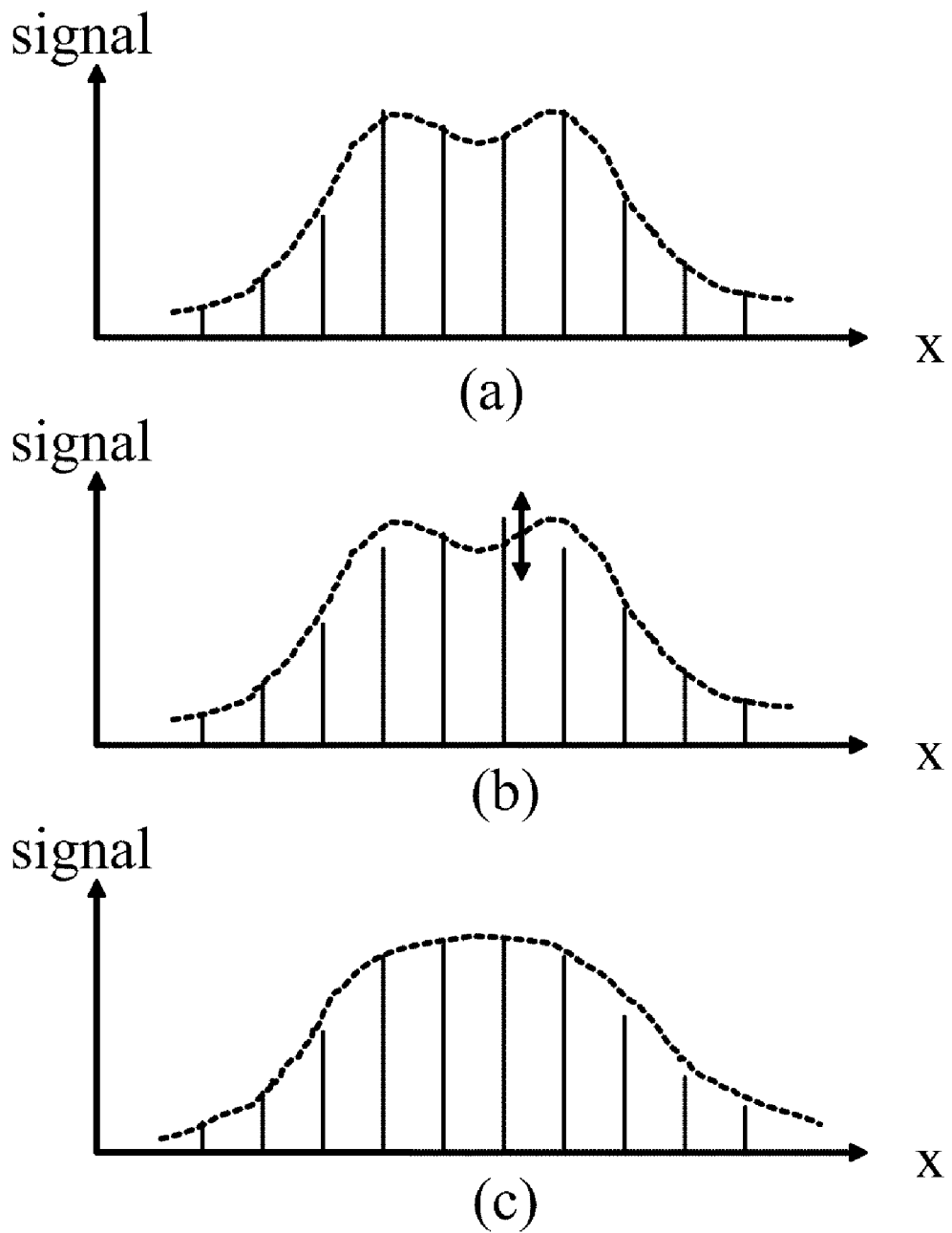
FIG. 2 shows various waveform profiles for a sensing signal when there are two touches occurring.
Figure 3:
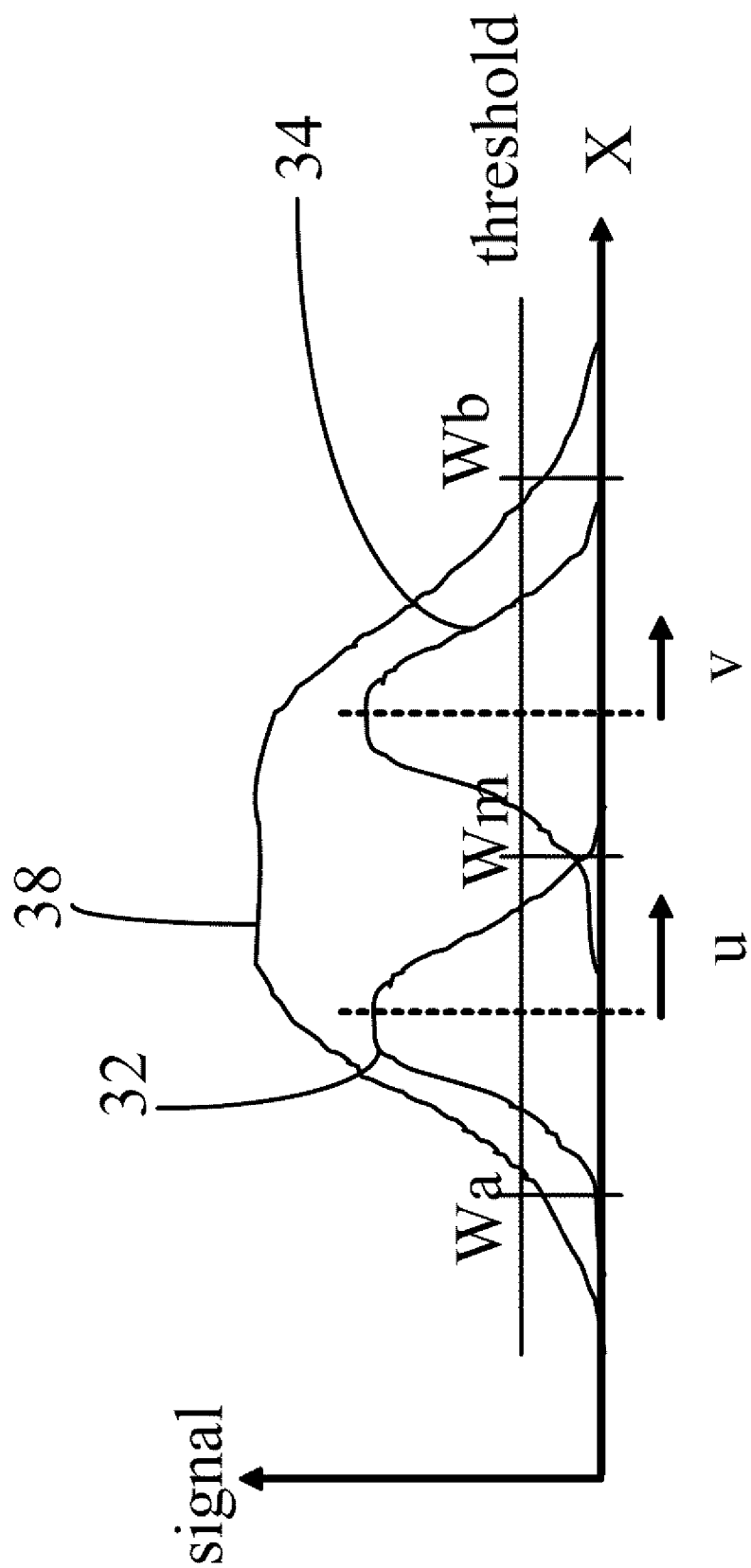
FIG. 3 is a diagram showing ideal waveform profiles of two touches and a sensing signal waveform for the two touches.

FIG. 3 is a diagram showing ideal waveform profiles of two touches and a sensing signal waveform for the two touches. In this example, the two touches occur at two different coordinates in X-axis dimension. For the sake of simplicity and clarity, the Y-axis dimension will not be discussed. However, it can be easily understood by persons skilled in this art that the Y-axis dimension is similar to the X-axis dimension. In FIG. 3, a profile 32 indicates a first touch, a profile 34 indicates a second touch. The touches can be done by fingers or other objects. The two touches occur at different X-axis coordinates at the same time. As shown, a centroid of the first touch profile 32 is at a position u, while a centroid of the second touch profile 34 is at a position v. The profiles 32 and 34 are ideal profiles. In practice, a sensing signal with a profile 38 is detected, which is substantially a sum of the first and second touch profiles 32 and 34 in an ideal condition.

In the present invention, a reference touch profile is stored in advance. The reference touch profile is an ideal touch profile such as the first touch profile 32 or the second touch profile 34. For example, when u=3, it indicates that the centroid of the reference touch profile is located at the third line. For a two-touch condition, the reference touch profile is duplicated and arranged with different spacing distances to compare with the sensing signal profile 38. By doing so, centroids of the two touches can be recognized even when there are noises or the two touches occur at close positions.

By progressively moving the two reference touch profiles 32 and 34, that is, changing the positions of u and v, and comparing the reference touch profiles 32 and 34 with the sensing signal profile 38, the most approximate result can be obtained. The set of (u, v) resulting in the most approximate result indicates the positions of the centroids of the two touches.

To determine a range for the movement of u and a range for the movement of v, a threshold is set as shown in FIG. 3. The level of the threshold is set to be able to distinguish a touch condition and a non-touch condition. The threshold intersects with the sensing signal profile at two points, of which the X-axis coordinates are Wa and Wb, respectively. The point Wa is a start point for searching the touch positions, and the point Wb is an end point for searching the touch positions. That is, the effective range for searching the touch positions is defined as [Wa, Wb]. In this drawing, the point Wm is a middle point between Wa and Wb. That is, the coordinate of Wm=(Wa+Wb)/2.

Generally, the position u can be found by searching in the range from Wa to Wm, and the position v can be found by searching in the range from Wm to Wb. However, to ensure the searching result is the best one, the searching ranges for u and v can be extended slightly. For example, to find the position u, the searching range is extended as [Wa, Wm+1]; to find the position v, the searching range is extended as [Wm−1, Wb]. In one example, if the start point Wa and the end point Wb determined by the threshold are 9 and 16, that is, the search range is [9, 16]. This range can be extended by 2 from the start and the end, respectively. Therefore, the extended searching range becomes [9−2, 16+2]=[7, 18].

Figure 4:
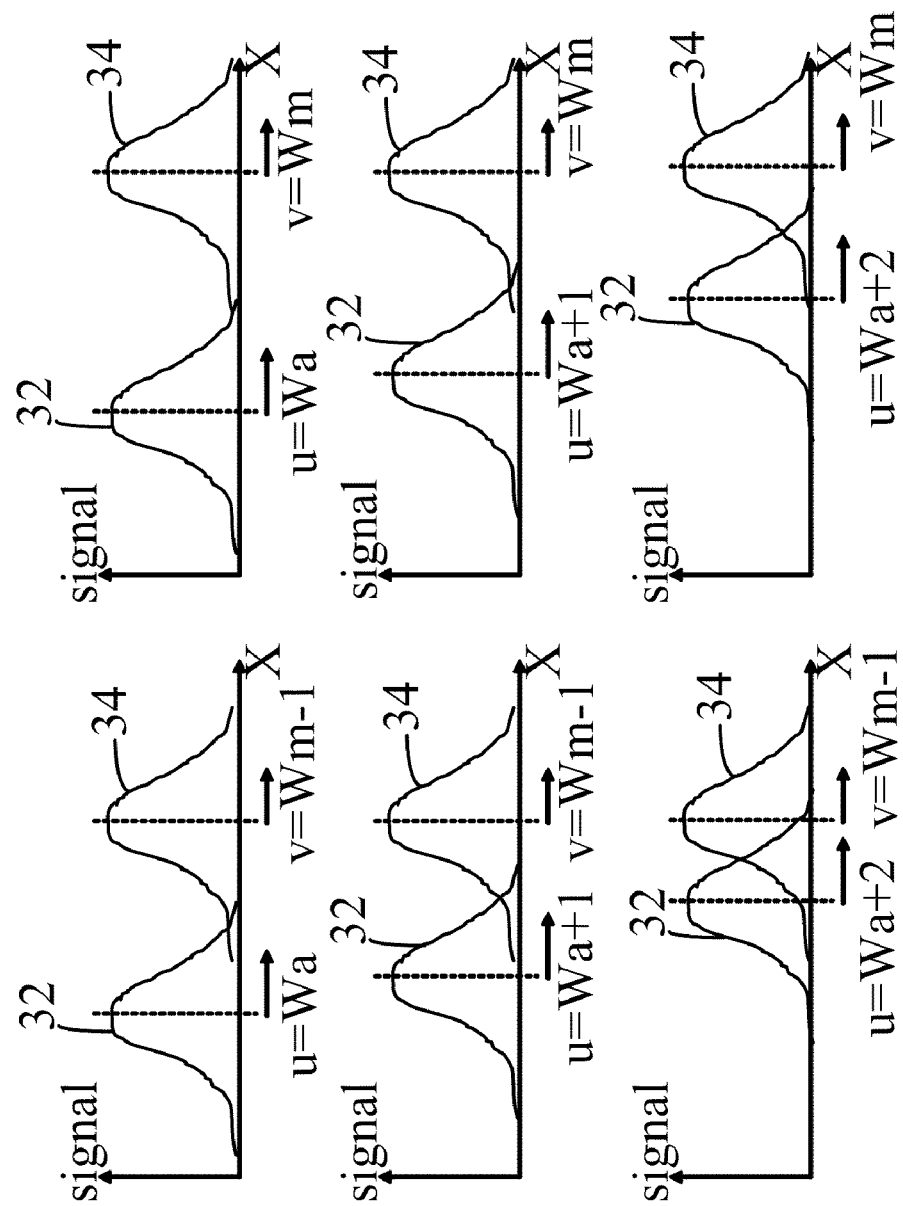
FIG. 4 shows different relative positions of centroids of two reference touch profiles.

FIG. 4 shows different relative positions of centroids of the two reference touch profiles 32, 34. An ideal combination profile IP(i, j) composed by the two reference profiles can be expressed as:

$$IP(i, j) = Su(i) \oplus Sv(j) \qquad (2)$$

where Su(i) is the touch profile 32, of which the centroid is at the position i (i.e. i=u); and Sv(j) is the touch profile 34, of which the centroid is at the position j (i.e. j=v). The variables i and j are within the searching range mentioned above.

In FIG. 4, six ideal combination profiles IP(i, j) are shown, including IP(Wa, Wm−1)=Su(Wa)⊕Sv(Wm−1), IP(Wa, Wm)=Su(Wa)⊕Sv(Wm), IP(Wa+1, Wm−1)=Su(Wa+1)⊕Sv(Wm−1), IP(Wa+1, Wm)=Su(Wa+1)⊕Sv(Wm), IP(Wa+2, Wm−1)=Su(Wa+2)⊕Sv(Wm−1), and IP(Wa+2, Wm)=Su(Wa+2)⊕Sv(Wm). Each of the ideal combination profiles IP(i, j) is matched with a sensing signal profile W(x1, x2) to obtain the optimal result, where x1 and x2 are the positions of the centroids of two actual touches.

The matching between the various ideal combination profiles IP(i, j) and the sensing signal profile W(x1, x2) can be implemented by using any proper algorithm, such as correlation, SAD (Sum of Absolute Difference) or MSE (Mean Square Error). When the correlation algorithm is used, summation of W(x1, x2)*(Su(i)⊕Sv(j)) is calculated, and the maximum result is the optimum result. When SAD or MSE is used, the differences between the various ideal combination profiles IP(i, j) and the sensing signal profile W(x1, x2) are calculated, respectively. The minimum result is the optimal result.

In the present embodiment, SAD algorithm is used. The SAD algorithm can be expressed as:

$$SAD = \frac{\sum_{i,j} \mathrm{abs}(IP(i, j) - W(x1, x2))}{N}, \qquad (3)$$

where N is the number of points (i.e. the sets of (i, j)) in an SAD map, that is, the number of the combinations of the positions u and v.

The values of u and v are progressively changed to synthesize various ideal combination profiles IP(i, j). The SAD results between the respective IP(i, j) and the sensing signal profile W(x1, x2) are calculated to compose an SAD map including the respective SAD results for different (u, v) sets. In such an SAD map, the minimum result is the optimal result, and the set (u, v) in correspondence to this minimum result indicates the estimated touch positions.

As mentioned, other algorithms such as MSE and correlation can also be used. The MSE algorithm can be expressed as:

$$MSE = \frac{\sum_{i,j} (IP(i, j) - W(x1, x2))^2}{N}. \qquad (4)$$

The correlation algorithm can be expressed as:

$$\mathrm{Correlation} = \frac{\sum_{i,j} (IP(i, j) * W(x1, x2))}{N}. \qquad (5)$$

The formula (2), which indicates the ideal combination profile IP can also be referred to as a reference touch profile synthesis formula, and can be further expressed as:

$$IP(i, j) = Su(i) \oplus Sv(j) = IP(i, j) = Su(i) + Sv(j) + k * Su(i) * Sv(j), \qquad (6)$$

where k indicates the coupling degree between the two reference touch profiles 32 and 34, that is, the overlapping degree of the two reference touch profiles 32 and 34. When k=0, it means that the two reference touch profiles are independent from each other and can be added together directly.

Figure 5:
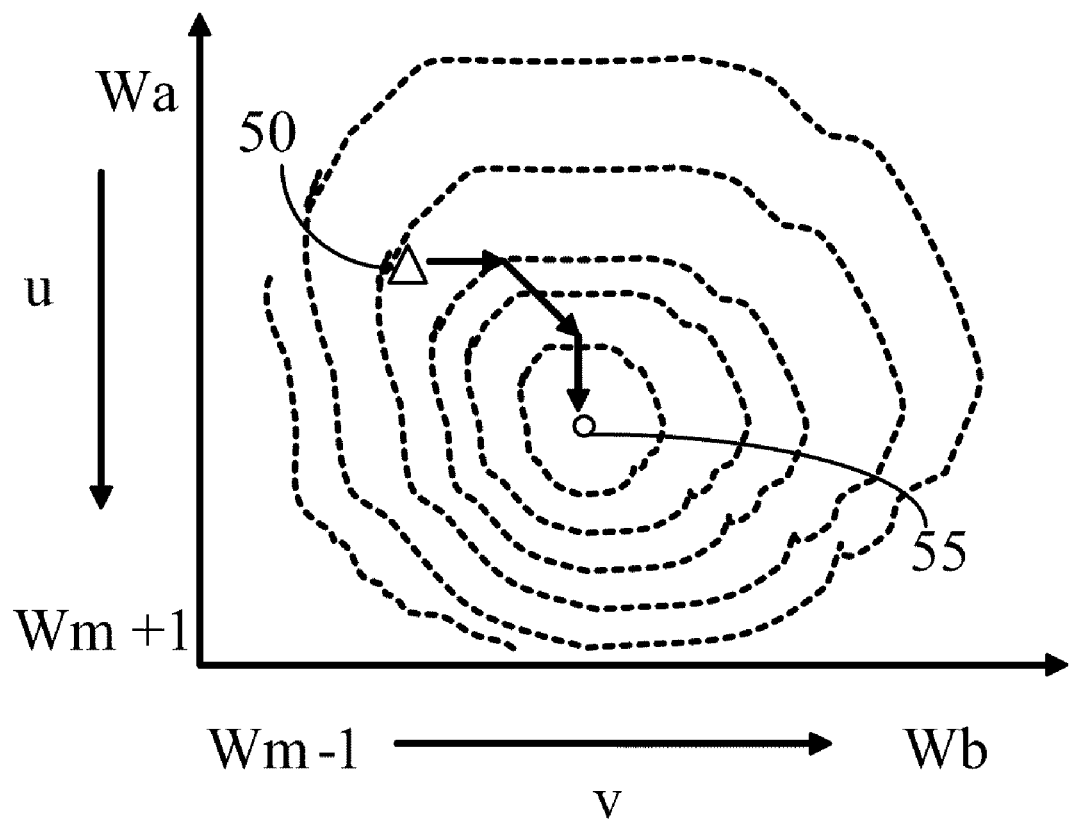
FIG. 5 shows an SAD (Sum of Absolute Difference) map for various combinations of u and v of two reference touch profiles.

FIG. 5 shows an SAD map for various combinations of u and v of the two reference touch profiles 32 and 34. In this SAD map, a beginning point 50, that is, a specific set (u, v), is selected to perform searching so as to find the minimum result 55. As shown, the searching range is determined as [Wa, Wm+1] for u, and the searching range is determined as [Wm−1, Wb] for v. If the beginning point 50 is properly selected, the minimum result 55 can be rapidly obtained.

To find the minimum result from the SAD map, there are various known methods can be used. In addition to a full searching method, some fast searching methods are adaptable for this, such as Steepest Gradient Searching Method, Three Steps Searching Method, Diamond Searching Method or the like.

Figure 6:
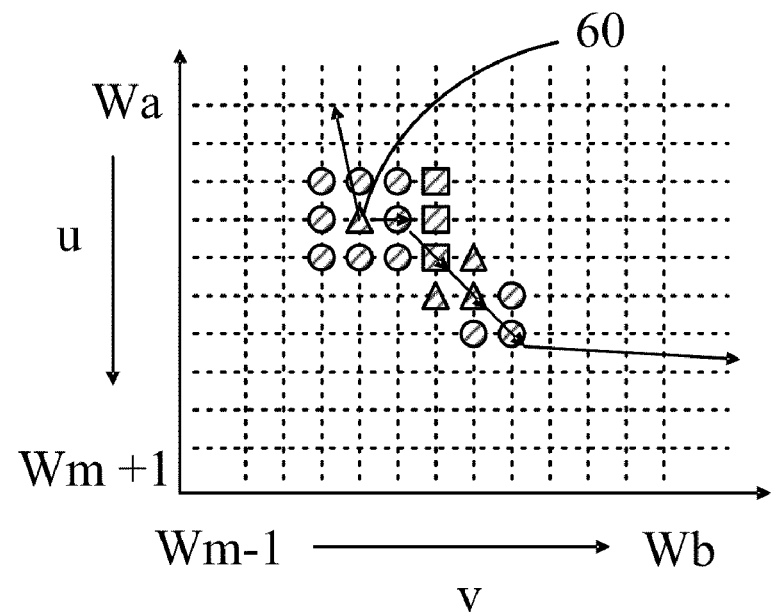
FIG. 6 schematically shows a Steepest Gradient Searching Method used in the present invention.
Figure 6:
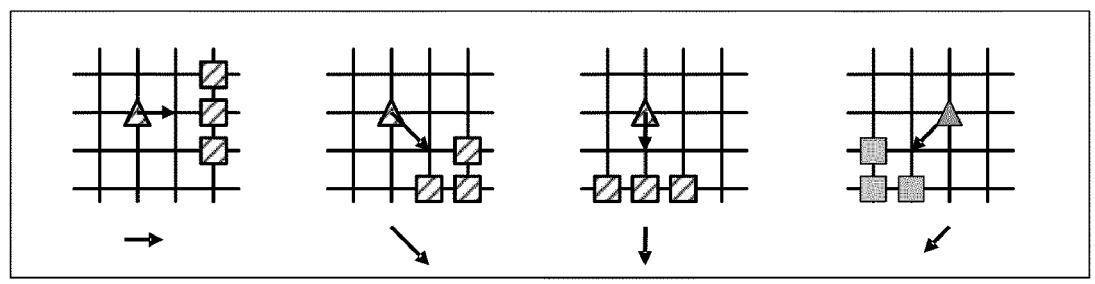

FIG. 6 schematically shows a Steepest Gradient Searching Method used in the present invention. As known, after a beginning point 60 (i.e. a specific set (u, v)) is selected, eight closest points around the beginning point 60 on the SAD map and the beginning point are checked to find out a relative minimum result among these nine points. Then, the searching is further performed toward the direction of the relative minimum result to check three points nearby the relative minimum result. The possible conditions are shown at the bottom of this drawing.

To search the best point (i.e. the optimal result), in addition to moving the position u or v by one unit each time, it is also possible to move the position by ½ unit, such as ½ pixel or even ¼ pixel. If the position u or v is moved by ½ pixel each time, the resolution reaches ½ pixel accordingly. If the position u or v is moved by ¼ pixel each time, the resolution reaches ¼ pixel accordingly.

Figure 7:
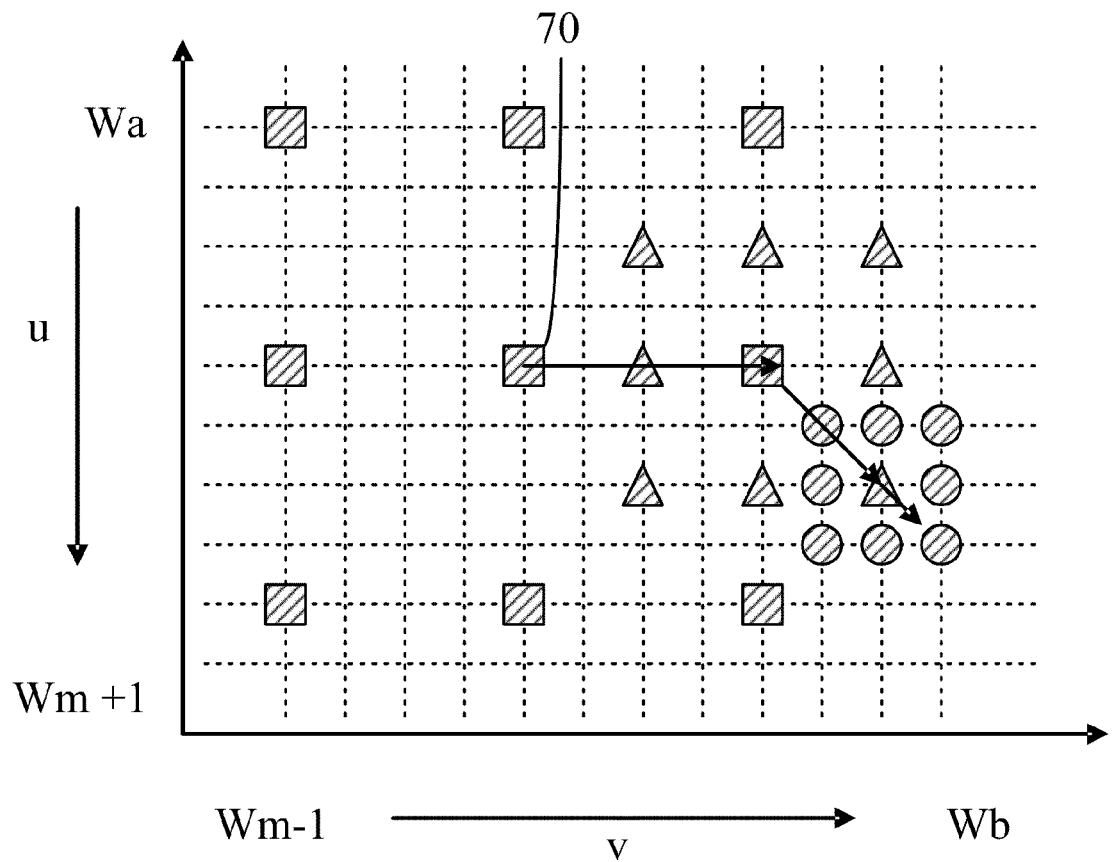
FIG. 7 schematically shows a Three Steps Searching Method used in the present invention.

FIG. 7 schematically shows a Three Steps Searching Method used in the present invention. After a beginning point 70 (i.e. a specific set (u, v)) is selected, eight points around the beginning point 70 at upper, bottom, right, left, upper-right, upper-left, bottom-right, bottom-left with a predetermined pitch therebetween as well as the beginning point 70 are checked, and a relative optimal point is determined. Then, another eight points around the relative optimal point at the eight directions as well as the relative optimal point are checked to find a second relative optimal point. The rest can be deduced accordingly. Finally, a resultant optimal point can be determined.

Figure 8:
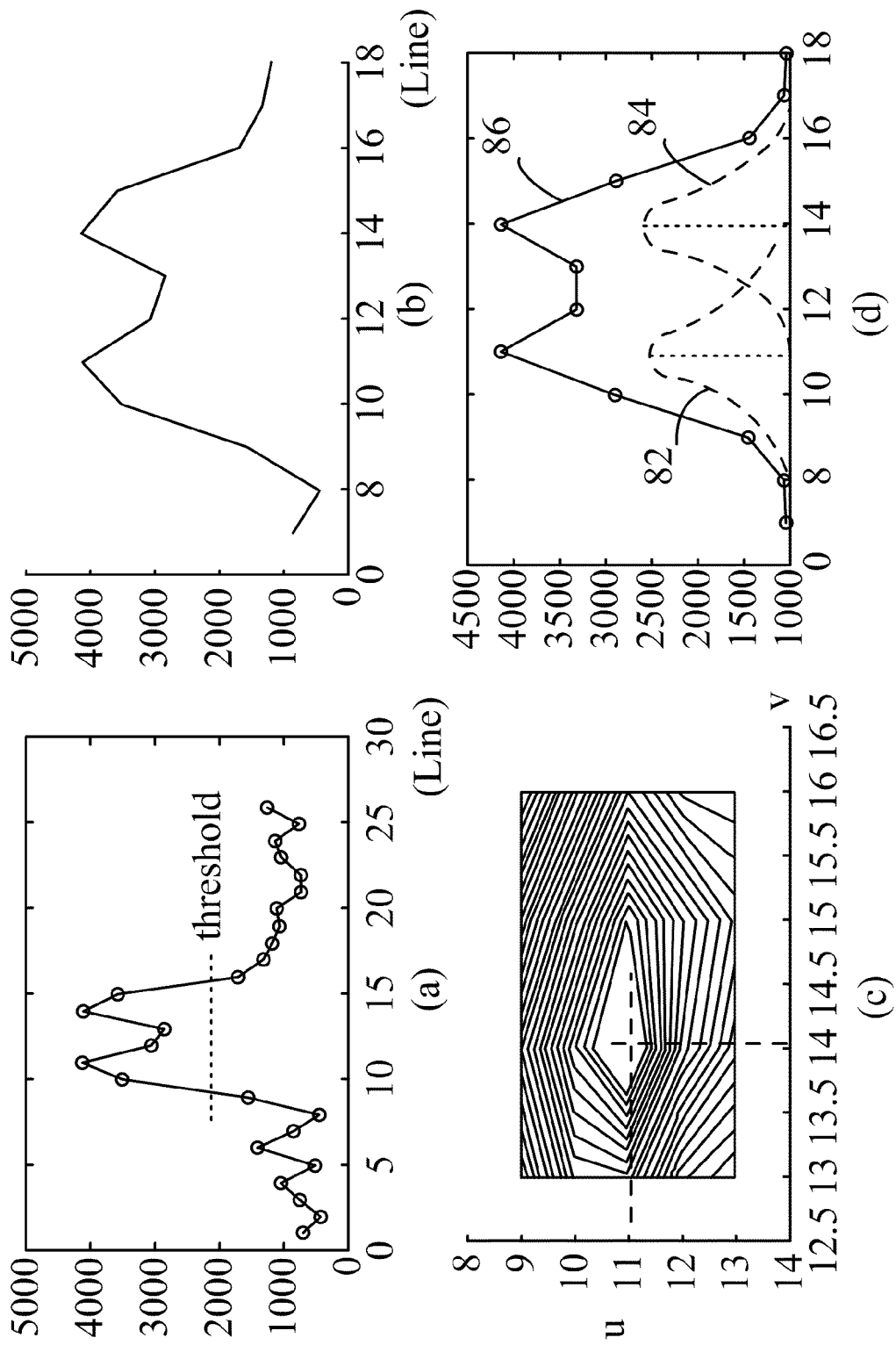
FIG. 8 shows four charts illustrating an example of implementation of the method in accordance with the present invention.

FIG. 8 shows four charts illustrating an example of implementation of the method in accordance with the present invention. The chart (a) shows a waveform of a sensing signal. In chart (a), the longitudinal axis is the signal amplitude, and the horizontal axis is the position. A threshold is used to define a searching range as described above. In this example, we obtain Wa=9 and Wb=16. To ensure optimal matching can be done, the range is extended by 2 from the start and end. That is, an adjusted searching range is [Wa−2, Wb+2]=[9−2, 16+2]=[7, 18]. The chart (b) is partially enlargement of the chart (a). The chart (c) is an SAD map obtained by matching the sensing signal waveform with two reference touch profiles at different positions as described above by using the SAD algorithm in this example. By searching the SAD map using a full searching method or a fast searching method, the minimum result appears at (u=11, v=14). That is, the coordinates 11, and 14 are the estimated positions of two finger touches. The chart (d) shows the two reference touch profiles 82, 84, each of which is a Gaussian-like waveform. A profile 86 indicates the ideal combination profile IP(11, 14), which is obtained by synthesizing the two reference touch profiles Su(11) 82 and Sv(14) 84. As can be seen, the sensing signal waveform in the chart (b) is very similar to the ideal combination profile IP(11, 14) 86.

It is noted that the matching methods such as correlation, SAD, and MSE essentially have a property of noise immunity. In the example shown in FIG. 8, the signal-to-noise ratio (SNR) is 10. However, as can be seen, the SAD map has the property of noise immunity. The location where the minimum result is obtained is not considerably influenced.

Figure 9:
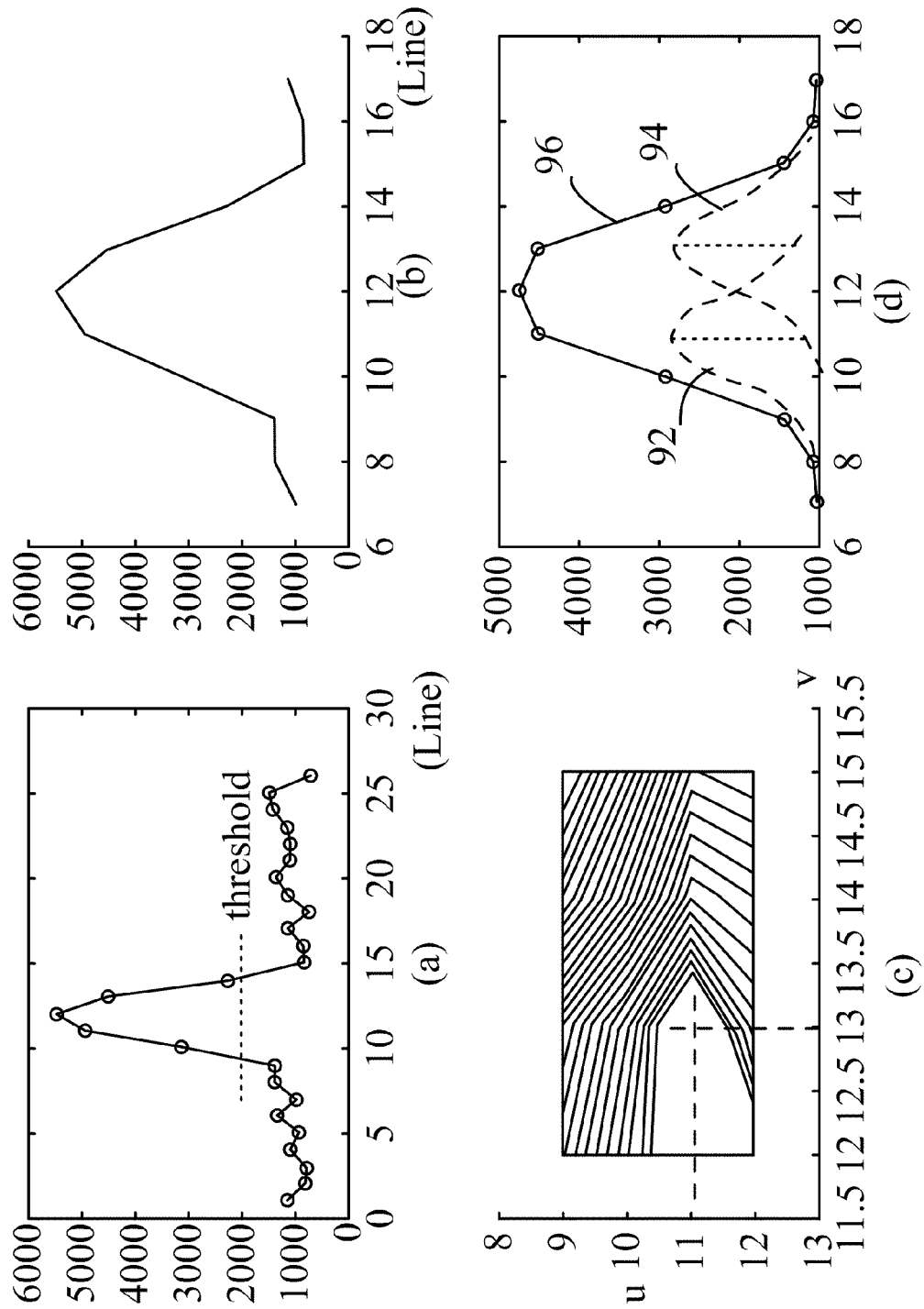
FIG. 9 shows four charts illustrating another example of implementation of the method in accordance with the present invention.

FIG. 9 shows four charts illustrating another example of implementation of the method in accordance with the present invention. The four charts are in correspondence with those in FIG. 8, and therefore the detailed descriptions are omitted herein to avoid redundancy. In this example, centroid positions of two finger touches are too close to each other, so that profiles are merged together. As can be seen in the chart (d), two positions of the minimum results obtained from the SAD map are very close, so that the two reference touch profiles 92 and 94 are very close. As a result, an ideal combination profile 96 obtained by synthesizing the two reference touch profiles 92 and 94 does not have a "peak-valley-peak" shape. However, by using the method of the present invention, the correct touch positions can also be obtained under such a circumstance.

Figure 10:
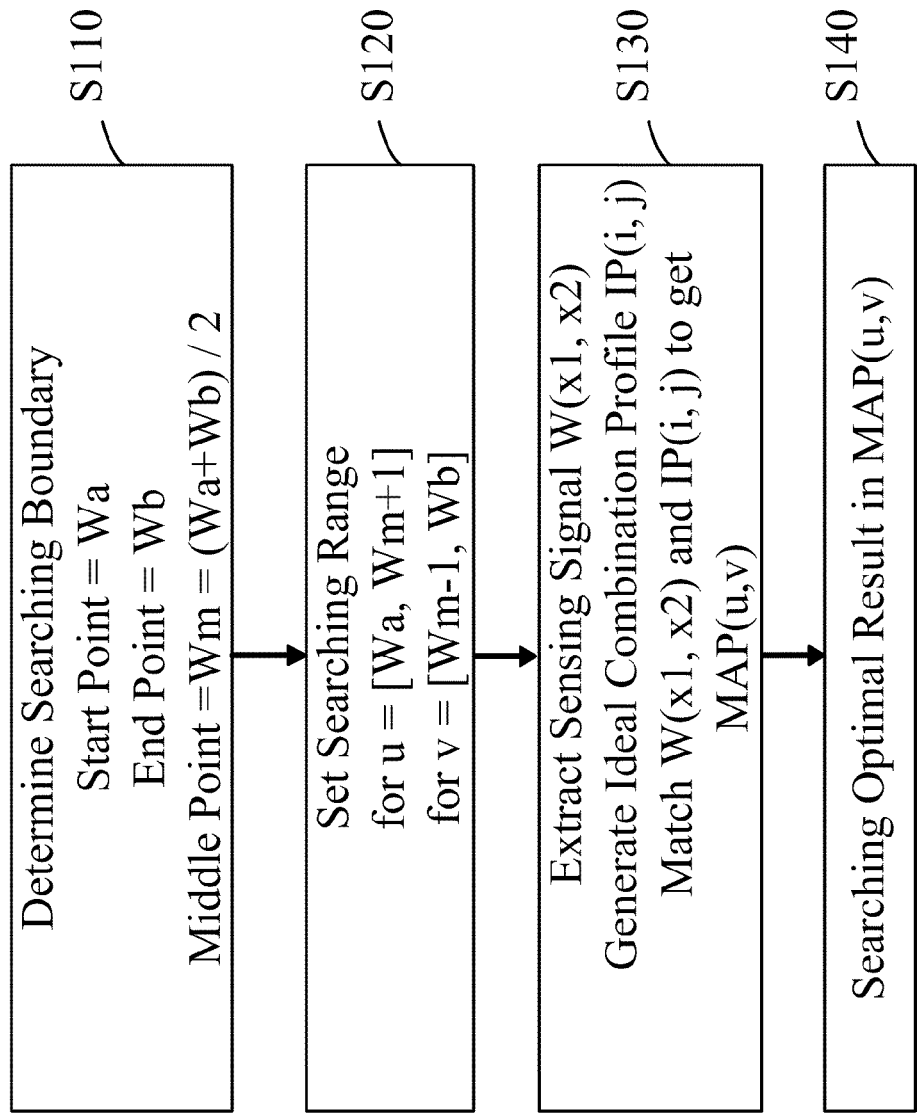
FIG. 10 is a flow chart showing the method of the present invention when using full searching to determine two finger touch positions.

The method of the present invention when being implemented by using the full searching can be generalized as a flow chart shown in FIG. 10. FIG. 10 is a flow chart showing the method of the present invention when using full searching to determine two finger touch positions. In step S110, a boundary for performing matching operation is determined. As described, a start point Wa and an end point Wb can be obtained by setting a threshold for a sensing signal. In addition, a middle point Wm can be obtained as Wm=(Wa+Wb)/2.

In step S120, a searching range is set by slightly extending the boundary. For example, the searching range for finding a first finger touch position u can be set as [Wa, Wm+1], while the searching range for finding a second finger touch position v can be set as [Wm−1, Wb].

In step S130, a sensing signal profile W(x1, x2) is extracted from a touch sensor of a touch panel, for example, where x1 and x2 indicate the positions of the two finger touches. An ideal combination profile IP(i, j) is generated by synthesizing two reference touch profiles Su(i) and Sv(j), where Wa≦i≦Wm+1, and Wm−1≦j≦Wb in this example. By changing the values i and j for the position u and v, a number of ideal combination profiles IP(i, j) can be obtained. The sensing signal profile W(x1, x2) is matched with the IP(i, j) by using any proper algorithm to get a map MAP(u, v) (e.g. SAD map). In step S140, an optimal result is searched in the map MAP(u, v). The specific set (u, v) corresponding to the optimal result indicates the actual finger touch positions.

Figure 11:
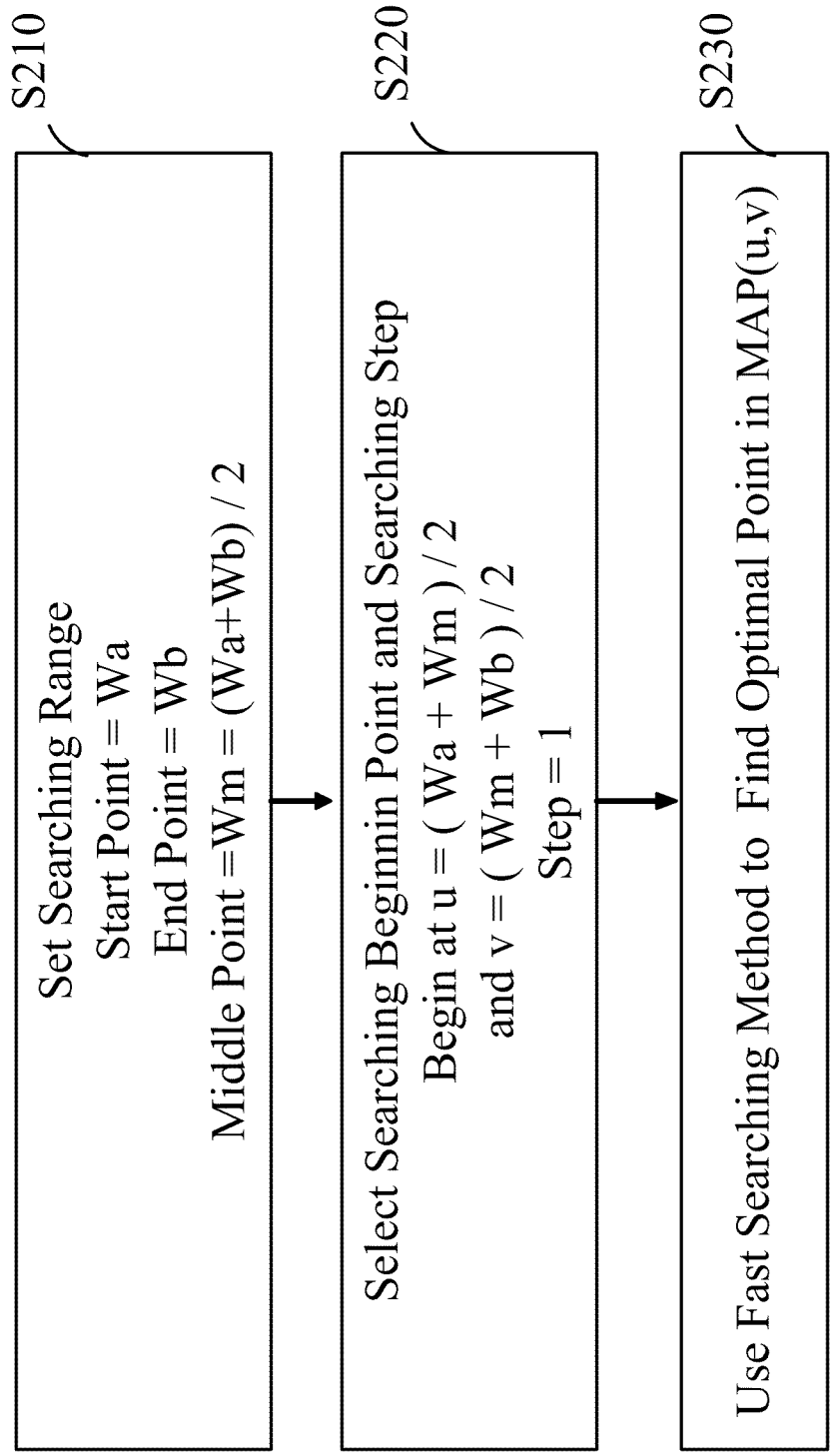
FIG. 11 is a flow chart showing the method of the present invention when using fast searching to determine two finger touch positions.

FIG. 11 is a flow chart showing the method of the present invention when being implemented by using fast searching to determine two finger touch positions. In step S210, a boundary for performing matching operation is determined. As described, a start point Wa and an end point Wb can be obtained by set a threshold for a sensing signal. In addition, a middle point Wm can be obtained as Wm=(Wa+Wb)/2. In step S220, a searching beginning point (i.e. a specific set (u, v)) is selected, and a searching step is selected. If the searching step is selected as one pixel, then the resolution reaches one pixel. If the searching step is selected as ¼ pixel, then the resolution reaches ¼ pixel. In this example, we choose (u=(Wa+Wm)/2, v=(Wm+Wb)/2)) as the beginning point, and the searching step=1. In step S230, a fast searching method such as Steepest Gradient Searching Method, Three steps Searching Method or the like is used to find the optimal result from a map of matching the sensing signal profile W(x1, x2) and the ideal combination profile IP(i, j) from the beginning point.

The reference touch profile can be obtained in various manners. For example, it is performable that a touch profile is measured in advance and signal level values of multiple points of the measured profile are stored in a memory such as an ROM (Read Only Memory) or flash of a product in a form of an LUT (Look-Up Table). When being used, the signal level values of the multiple points can be read from the LUT.

The reference touch profile can be generated by a mathematic expression such as a Gaussian distribution expressed as:

$$S = \exp\left(\frac{-(i-u)^2}{2\sigma^2}\right) \quad (7)$$

where S is the reference touch profile, i is the position (e.g. the $i^{th}$ line), u is the centroid position of the reference touch profile S, and σ is a width of an ideal finger or other proper object. The wider the finger is, the greater the parameter σ is.

Otherwise, the reference touch profile can be obtained or adjusted by dynamically gathering statistics of actual finger touch profiles.

Figure 12:
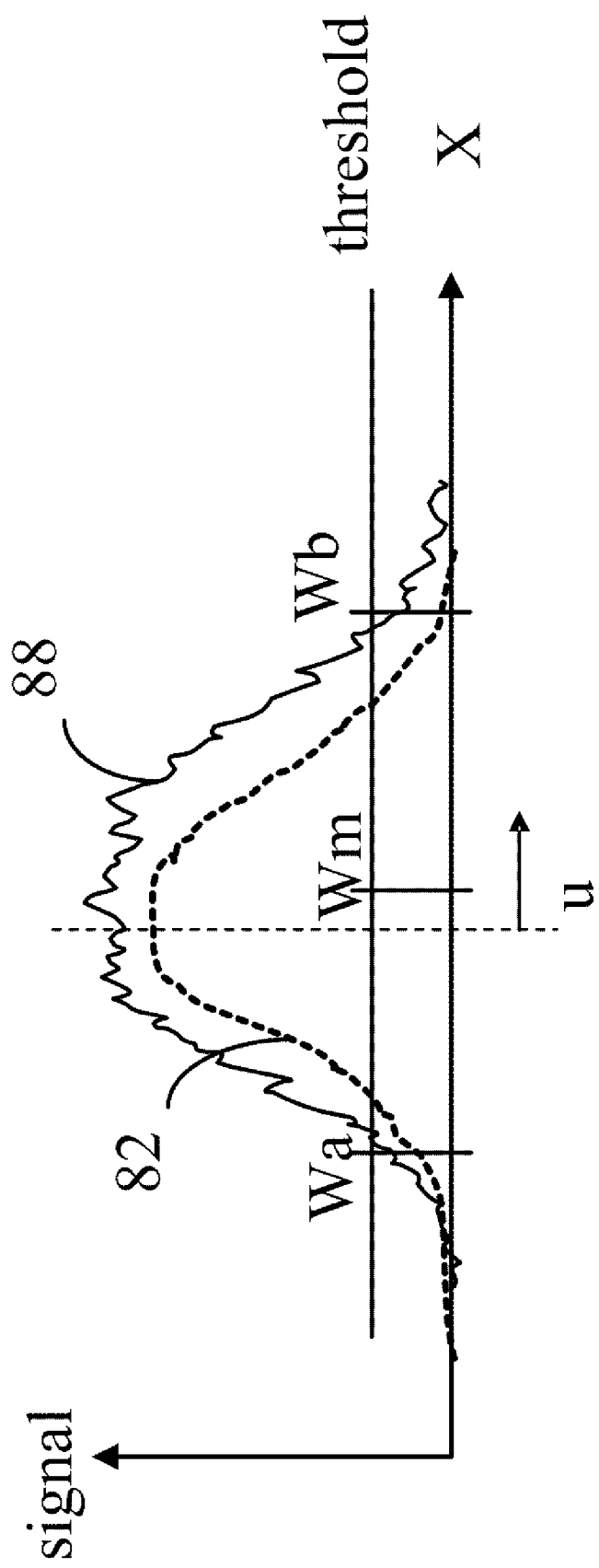
FIG. 12 is a diagram showing an ideal waveform profile of one touch and a sensing signal waveform for one touch.

The method of the present invention is especially adaptable for determining positions of multiple touches. However, the present invention may also be applied to determine a position of a single touch. FIG. 12 is a diagram showing an ideal waveform profile of one touch and a sensing signal waveform for one touch. In this drawing, a reference touch profile is indicated by a reference number 82, and a sensing signal profile is indicated by a reference number 88. As the case of two touches, a threshold of signal amplitude is given to determine a searching range. The two points of the sensing signal profile 88 intersecting with the threshold correspond to a start point Wa and an end point Wb. Therefore, the searching range is set as [Wa, Wb]. As described above, the searching range can be slightly extended. The reference touch profile Su(i) 82 is moved, that is, the variable i is varied. The sensing signal profile 88 is matched with the moved reference touch profile Su(i) 82 to find the best matching. The reference touch profile Su(i) 82 can be moved by one pixel, ½ pixel or ¼ pixel at a time, for example. If a fast searching method is used, a middle point Wm between the start point Wa and the end point Wb will be a proper beginning point for searching in general.

It can be easily deduced that the present invention can also be applied to determine positions of three touches or more. In such a case, three or more reference touch profiles should be provided, and an optimal result will be found from a three-dimensional or higher-dimensional map (e.g. SAD map). If a proper searching range is determined and a proper beginning point is selected, the touch positions of these multiple touches can also be rapidly found by using a fast searching method such as the Steepest Gradient Searching Method mentioned above.

Figure 13:
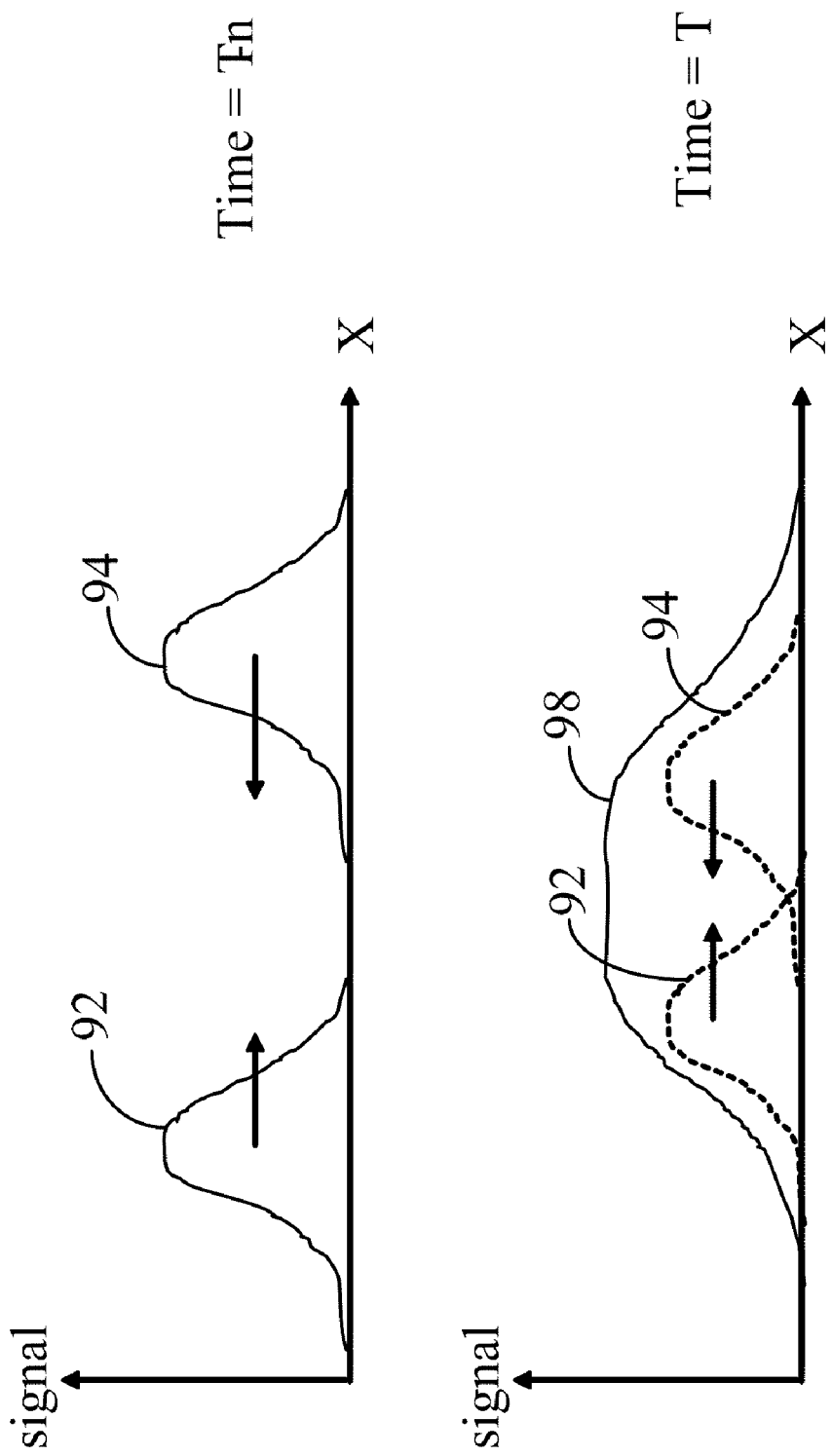
FIG. 13 shows a separate condition and an overlapping condition of two touches.

FIG. 13 shows a separate and an overlapping conditions of two touches. The upper chart of this drawing shows two touch profiles 92 and 94 are separated from each other at time T-n. These two touches are moving toward each other. At time T, the two touch profiles 92 and 94 overlap with each other, and result in a combination profile 98 as shown. As can be seen, the profile 98 does not have a "peak-valley-peak" shape. Instead, the profile 98 is a Gaussian-like waveform. However, a signal width and a signal height of the profile 98 are significantly greater than those of the profile 92 or 94 for a single touch. Accordingly, it is possible to judge a touch event occurring in a specific touch region is a single touch or two touches by setting proper limits th1 and th2 for the signal width and height even when the sensing signal profile does not clearly indicate two peaks. When it is determined as an event of two touches, the two touches sensing process described above is activated. The two touches sensing process can also be activated when we have known that there are two isolate finger touches occur in a previous state.

Figure 14:
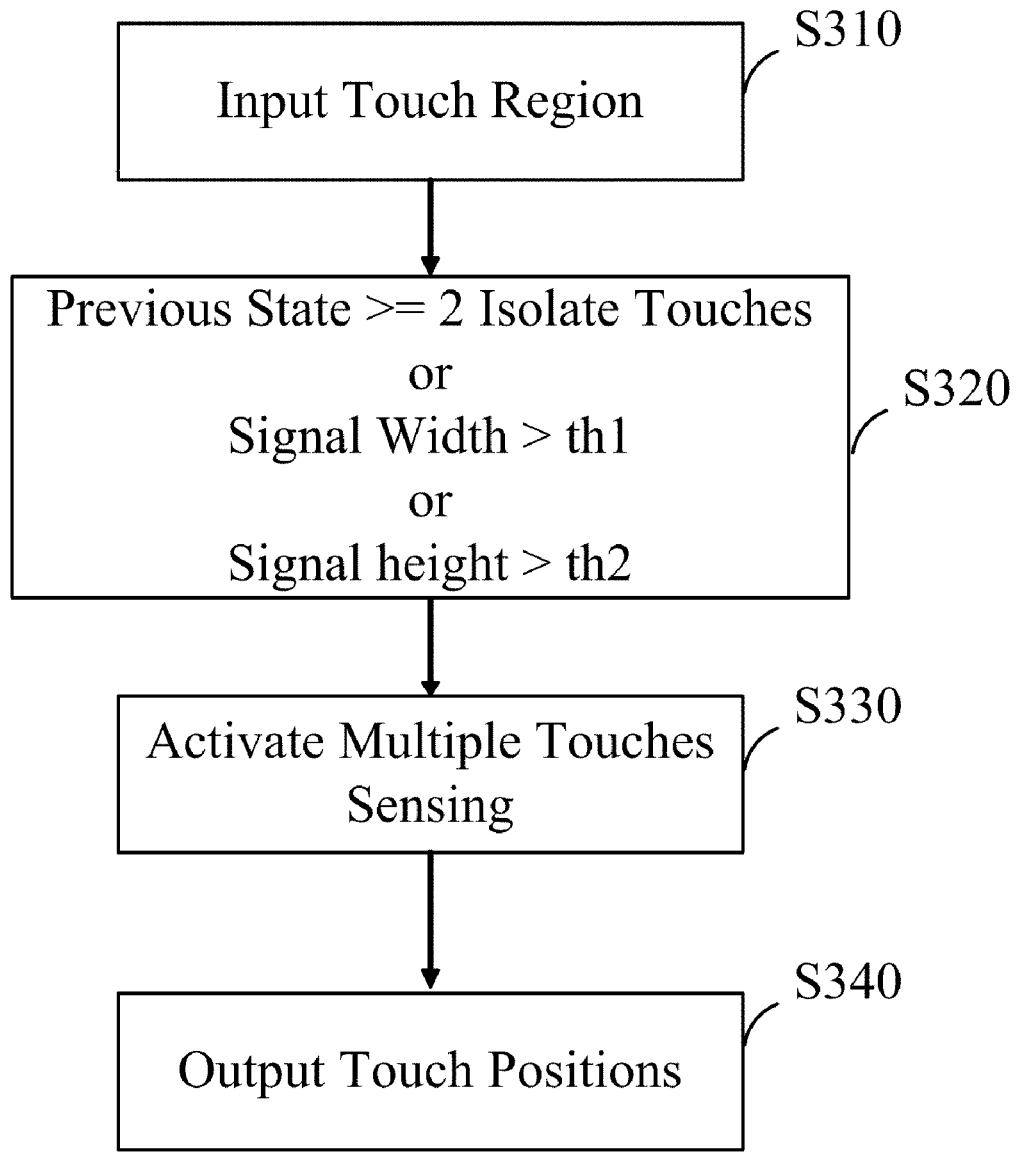
FIG. 14 is a flow chart showing a process for determining whether to activate a multiple touches sensing process.

FIG. 14 is a flow chart showing a process for determining whether to activate a multiple touches sensing process or not. In step S310, a touch region is input. In this touch region, a sensing signal indicates that there is at least one touch occurring. In step S320, it is checked if any of the following conditions is met: (1) that there are two isolate finger touches in a previous state (e.g. at time T-n); (2) a signal width of the sensing signal is greater than a signal width limit th1; and (3) a signal height of the sensing signal is greater than a signal height limit th2. When at least one of these three conditions is met, a multiple touches sensing process as described above is activated in step S330 to find the touch positions. In step S340, the estimated touch positions are output.

Figure 15:
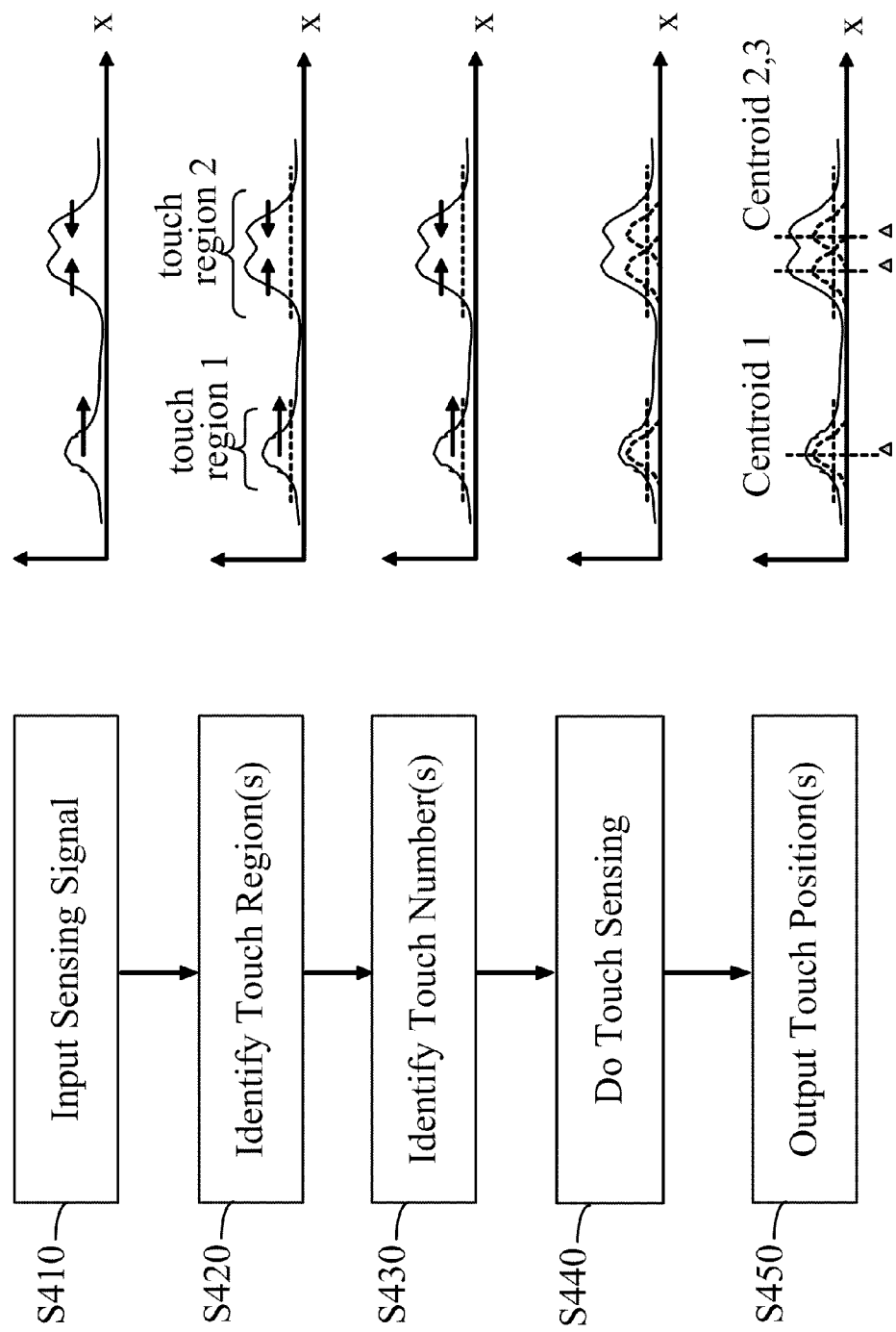
FIG. 15 shows a process for sensing touches in different regions.

FIG. 15 shows a process for sensing touches in different regions. A flow chart is shown at the left side, and waveform charts corresponding to the respective steps of the process are shown at the right side. In step S410, a sensing signal is input. The waveform of the sensing signal is shown at the right side. In step S420, touch regions are identified. In this example, the sensing signal indicates that there are two touch regions: touch region 1 and touch region 2. In step S430, a count of touch(es) is identified for each region by using the process shown in FIG. 14, for example. In the present example, it is determined that there is one finger touch in the touch region 1 and there are two finger touches in the touch region 2. In step S440, the touch sensing method of the present invention described above is performed to the touch region 1 by using a single reference touch profile to match the sensing signal profile in the touch region 1 and is performed to the touch region 2 by using two reference touch profiles to match the sensing signal profile in the touch region 2, respectively, to find the touch positions. In step S450, estimated centroid position of the touch in the touch region 1 and centroid positions of the touches in the touch region 2 are output.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A touch sensing method for detecting touching to a touch sensor, the method comprising:
    providing a reference touch profile indicating an ideal touch;
    extracting a sensing signal from the touch sensor;
    matching the reference touch profile with the sensing signal to find an optimal result by moving the reference touch profile; and
    identifying a position of touching from the reference touch profile in correspondence to the optimal result.

2. The method of claim 1 further comprising setting a searching range, wherein the searching range is defined by setting a signal amplitude threshold to the sensing signal, a position of a centroid of the reference touch profile falling within the searching range when being moved.

3. The method of claim 2, wherein the matching step comprises:
    moving the reference touch profile progressively by a searching step by changing the position of the centroid of the reference touch profile within the searching range; and
    comparing the reference touch profile with the sensing signal whenever the reference touch profile is moved by one searching step so as to obtain an optimal result.

4. The method of claim 2, wherein the matching step comprises:
selecting a beginning point within the searching range for searching, the beginning point indicating a specific position for the centroid of the reference touch profile; and
comparing the reference touch profile with the sensing signal beginning with a state in which the position of the centroid of the reference touch profile is at the beginning point by using a fast searching method so as to find the optimal result.

5. The method of claim 4, wherein the fast searching method is implemented by a Steepest Gradient Searching Method.

6. The method of claim 4, wherein the fast searching method is implemented by a Three Steps Searching Method.

7. The method of claim 1, wherein the matching step to find an optimal result is implemented by correlating the reference touch profile with the sensing signal to find the maximum result as the optimal result.

8. The method of claim 1, wherein the matching step to find an optimal result is implemented by calculating a difference between of the reference touch profile and the sensing signal to find the minimum result as the optimal result.

9. The method of claim 8, wherein the difference is calculated by using an SAD (sum of absolute difference) algorithm.

10. The method of claim 8, wherein the difference is calculated by using an MSE (mean square error) algorithm.

11. A touch sensing method for detecting multiple touches to a touch sensor, the method comprising:
providing a reference touch profile indicating an ideal touch;
extracting a sensing signal from the touch sensor;
synthesizing a plurality of the reference touch profiles to compose an ideal combination profile;
matching the ideal combination profile with the sensing signal by changing positions of centroids of the reference touch profiles composing the ideal combination profile so as to find an optimal result; and
identifying positions of touching from the ideal combination profile in correspondence to the optimal result.

12. The method of claim 11, further comprising setting a searching range, wherein the searching range is defined by setting a signal amplitude threshold to the sensing signal; and positions of centroids of the reference touch profiles composing the ideal combination profile falling within the searching range when being changed.

13. The method of claim 12, wherein a sub-range for changing the position of the centroid of each reference touch profile is determined from the searching range.

14. The method of claim 12, wherein the matching step comprises:
varying the ideal combination profile progressively by a searching step by changing positions of the centroids of the reference touch profiles composing the ideal combination profile within the searching range; and
comparing the ideal combination profile with the sensing signal whenever one of the positions of the centroids of the reference touch profiles is changed by one searching step to synthesize the ideal combination profile so as to obtain an optimal result.

15. The method of claim 12, wherein the matching step comprises:
selecting a beginning point within the searching range for searching, the beginning point indicating specific positions for the centroids of the reference touch profiles composing the ideal combination profile; and
comparing the ideal combination profile with the sensing signal beginning with a state in which the centroids of the reference touch profiles meet the beginning point by using a fast searching method so as to find the optimal result.

16. The method of claim 15, wherein the fast searching method is implemented by a Steepest Gradient Searching Method.

17. The method of claim 15, wherein the fast searching method is implemented by a Three Steps Searching Method.

18. The method of claim 11, wherein the matching step to find an optimal result is implemented by correlating the ideal combination profile with the sensing signal to find the maximum result as the optimal result.

19. The method of claim 11, wherein the matching step to find an optimal result is implemented by calculating a difference between of the ideal combination touch profile and the sensing signal to find the minimum result as the optimal result.

20. The method of claim 19, wherein the difference is calculated by using an SAD (sum of absolute difference) algorithm.

21. The method of claim 19, wherein the difference is calculated by using an MSE (mean square error) algorithm.

22. A touch sensing method for detecting touching to a touch sensor, the method comprising:
providing a reference touch profile indicating an ideal touch;
extracting a sensing signal from the touch sensor;
identifying a touch region from the sensing signal, at least one touch occurring in the touch region;
identifying how many touches has occurred in the touch region;
matching the reference touch profile with the sensing signal to find an optimal result by moving the reference touch profile when it is determined that there is only one touch in the touch region while synthesizing a plurality of the reference touch profiles to compose an ideal combination profile and matching the ideal combination profile with the sensing signal by changing positions of centroids of the reference touch profiles composing the ideal combination profile so as to find the optimal result when it is determined that there are plural of touches in the touch region; and
identifying a position or positions of touching from the reference touch profile or the ideal combination profile in correspondence to the optimal result.

* * * * *